United States Patent
Boynton et al.

(10) Patent No.: US 7,359,369 B2
(45) Date of Patent: Apr. 15, 2008

(54) MODEM RELAY AGGREGATOR DEVICE

(75) Inventors: Scott Anthony Boynton, San Jose, CA (US); Alex Urquizo, Burlington, MA (US); Vincent Todd Grove, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 1093 days.

(21) Appl. No.: 10/209,052

(22) Filed: Jul. 30, 2002

(65) Prior Publication Data

US 2004/0022241 A1 Feb. 5, 2004

(51) Int. Cl.
*H04L 12/66* (2006.01)
(52) U.S. Cl. .................... 370/352; 370/522; 370/395.2
(58) Field of Classification Search ..................... None
See application file for complete search history.

(56) References Cited

U.S. PATENT DOCUMENTS

| | | | | |
|---|---|---|---|---|
| 6,434,169 B1 * | 8/2002 | Verreault | ..................... | 370/522 |
| 6,751,304 B1 * | 6/2004 | Edmon et al. | ........... | 379/93.32 |
| 6,965,600 B2 * | 11/2005 | George | ........................ | 370/392 |
| 6,970,430 B2 * | 11/2005 | Guven et al. | ................ | 370/252 |
| 6,980,560 B2 * | 12/2005 | Ryan et al. | .................. | 370/401 |
| 6,985,481 B2 * | 1/2006 | Brent et al. | ................. | 370/352 |
| 6,993,013 B1 * | 1/2006 | Boyd | ........................ | 370/352 |
| 7,042,833 B1 * | 5/2006 | George et al. | .............. | 370/216 |
| 7,075,979 B2 * | 7/2006 | Beadle et al. | ................ | 375/222 |
| 7,106,743 B1 * | 9/2006 | Kavulak et al. | ......... | 370/395.1 |
| 7,126,711 B2 * | 10/2006 | Fruth | ........................ | 358/1.15 |
| 2003/0123466 A1 * | 7/2003 | Somekh et al. | ............. | 370/401 |
| 2003/0210679 A1 * | 11/2003 | Grove et al. | ................ | 370/352 |

FOREIGN PATENT DOCUMENTS

| EP | 1 220 488 A2 | 7/2002 |
|---|---|---|
| WO | WO 00/11843 | 3/2000 |
| WO | WO 01/91441 A1 | 11/2001 |

OTHER PUBLICATIONS

"V. MoIP: Modem over Packet Networks Technology", Surf Communications Solutions, 2001, pp. 1-7.*
Proposed Draft Text for D-006 version of V.MoIP, Telecommunications Industry Association (TIA), Columbia, MD., Jun. 12-14, 2002, TR-30.1/02-06-057, ITU-T Recommendation V.MOIP, "Procedures for the End-to-End Connection of V-Series DCES over an IP Network," http://ftp.tiaonline.org/TR-30/tr301/Public/TR-30.1/2002-06Columbia/10206058.zip.

* cited by examiner

*Primary Examiner*—Wing Chan
*Assistant Examiner*—Michael J. Moore, Jr.
(74) *Attorney, Agent, or Firm*—Marger Johnson & McCollom, P.C.

(57) ABSTRACT

A network device is disclosed. The network device has at least one port to receive modem over network signals. A router routes data associated with the modem over network signals received from an aggregator. The aggregator uncompresses the modem over network signals and sends the data associated with the signals to the router directly without relying upon a digital signal processor.

24 Claims, 3 Drawing Sheets

MODEM RELAY AGGREGATOR DEVICE

BACKGROUND

1. Field

This disclosure relates to modem relay, more particularly to modem relay devices that combine egress gateways and remote access servers.

2. Background

The International Telecommunications Union (ITU) is in the process of approving a new standard for modem sessions over packet networks, referred to as modem over Internet Protocol (V.MoIP). It must be noted that this standard may actually apply to all packet networks, not just IP.

Modem relay terminates the physical layer and link layer error correction/detection protocol at the ingress gateway and may send compressed data over a packet network to an egress gateway. The first leg of the call occurs between the modem and the ingress gateway, where the modem signals are converted to packets. The second leg of the call sends the packets across the data network to the egress gateway. The final leg of the call, between the egress gateway and the remote access server, remodulates the packet data back into modem signals and sends the modem signals to the remote access server.

Typically, the egress gateway terminates the physical layer at the gateway and has a processor that handles the remodulation and connection between the egress gateway and the remote access server.

SUMMARY

One embodiment of the invention is a network device having at least one port to receive modem over network signals. A router routes data associated with the modem over network signals received from an aggregator. The aggregator uncompresses the modem over network signals and send the data associated with the signals to the router directly.

Ingress gateways communicating with the network device negotiate with the client modem without waiting for modem response tones from the network device. The ingress gateway has either already identified the network address to which the modem is trying to connect to be a such a network device, or it is informed of that during call setup. The ingress gateway then routes data associated with the call to the network device.

The network device receives signals indicating that there is an incoming modem over data network call and communicates with the ingress gateway. The network device then routes the data as if it were a remote access server.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
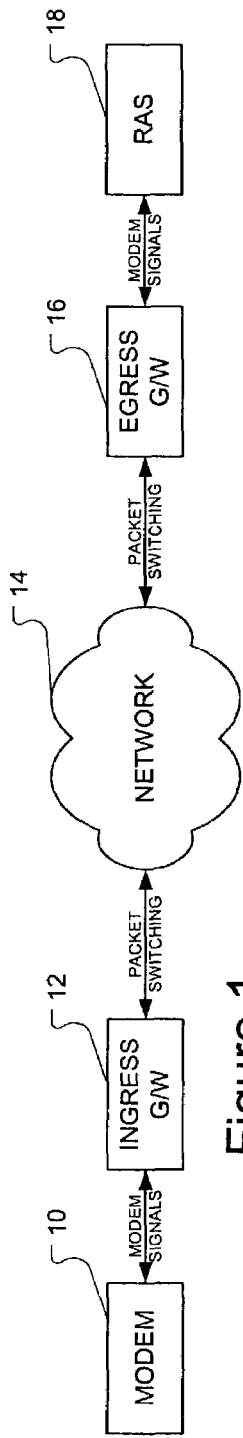
FIG. 1 shows an embodiment of a network employing modem relay, in accordance with the prior art.
Figure 2:
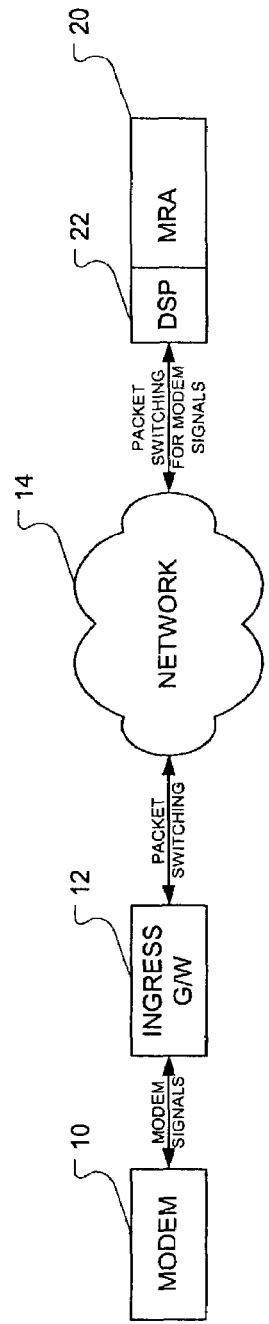
FIG. 2 shows an embodiment of a network employing modem relay, in accordance with the prior art.

An example of a network capable of transmitting modem signals over a network in accordance with the prior art is shown in FIG. 1. Client modem 10 dials the ingress gateway 12. The ingress gateway 12 then connects to the egress gateway 16, which dials the remote access server (RAS) 18 based on the information provided by the ingress gateway. Both gateways proceed to negotiate their capabilities during call setup using out-band signaling such as H.323, session initiation protocol (SIP), or media gateway control protocol (MGCP). Once the gateways' capabilities are known, the modems proceed to negotiate. Usually, the answer modem (RAS) sends an Answer tone to start the modem physical layer train-up.

The ingress gateway 12 accepts the modem tone signals and converts them to packet data and transmits them across the network 14 to the egress gateway 16. Egress gateway 16 then reconverts the data back into modem tones via remodulation and transmits those tones to the remote access server (RAS) 18. The process is then performed in the reverse direction to facilitate call setup and negotiation between the modem 10 and the remote access server (RAS) 18.

In the ITU standard for Modem Relay, currently under development, the physical layer and link layer error correction/detection protocol are terminated at the ingress gateway. The egress gateway may perform error correction/detection and remodulate the data into the modulated tones necessary for communication with the RAS 18.

In an alternative embodiment of current implementation in accordance with the prior art, the egress gateway and the remote access server are combined into one device referred to as a modem relay aggregator (MRA) 20. The MRA 20 has a digital signal processor 22 that generates and provides the modem response tones necessary to communicate with the client modem 10. However, it is possible to provide an MRA that does not require a digital signal processor, or any modem physical layer negotiation with the client modem.

Figure 3:
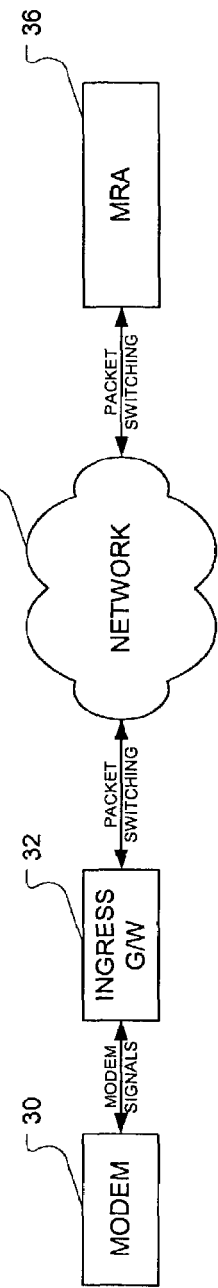
FIG. 3 shows an embodiment of a network employing modem relay, in accordance with embodiments of the invention.

As can be seen in FIG. 3, the client modem 30 transmits modem tones to the ingress gateway 32, which converts those tones to packet data and transmits it across the network 34 to the MRA 36. With the deployment of an MRA, there can be an exchange of information during the call setup phase in which the ingress gateway determines that the remote access server to which the user wants to gain access is actually an MRA. Alternatively, the ingress gateway may already have the existence of the MRA associated with the address of the RAS before receiving any calls from modems trying to connect to that address.

In either case, if the ingress gateway has the information that the end of the connection is an MRA, the ingress gateway 32 can localize the modem negotiation and negotiate with the client modem 30 without receiving any modem response tones from the MRA 36. Once the modem negotiation is completed, the ingress gateway would route the information to the MRA 36 via the network 34 as if the MRA were now the RAS to which the client modem was trying to connect. The MRA would then route the data coming from the client modem, functioning as an RAS. For purposes of the discussion here, this data will be referred to as 'data associated with the modem over network call,' as the data being routed by the MRA in the capacity of an RAS is coming from a client modem that 'thinks' it is connected to a RAS as in the prior art implementation such as that of FIG. 1.

In this manner, there is no need for the MRA to generate modem response tones, and therefore no need for a DSP in the MRA. In addition to this simplification of the device, the MRA functioning without the modem response process eliminates any delays or packet drops that may occur during call discrimination or initial modem training. This may also provide faster modem connections, as there is only one modem connection in the circuit established between the modem 30 and the MRA 36.

Figure 4:
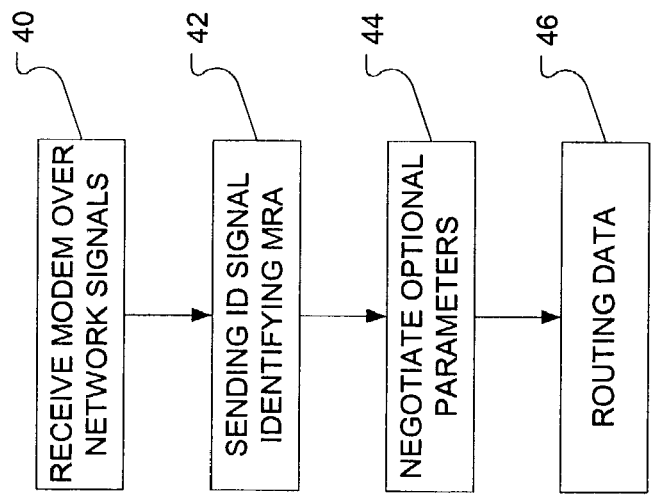
FIG. 4 shows a flow chart of one embodiment of a method to perform modem relay, in accordance with embodiments of the invention.

One embodiment of a process to connect a call at the MRA is shown in flowchart form in FIG. 4. The MRA receives modem over network signals in a control signal exchange with the ingress gateway at 40. No response to these signals may be necessary, as there is no need to generate the modem response tones. The modem over network signals may be the initial signals for call setup between the MRA and the client modem, or they may be other signals that initiate a call.

If the ingress gateway does not already understand that the egress gateway/RAS combination has been replaced by an MRA, or that the MRA will not be providing modem response tones, the MRA may send an identification signal at 42 that informs the ingress gateway of the nature of the MRA. This will then cause the ingress gateway to perform the modem negotiation without waiting for modem response tones from the MRA or the RAS. Once the call setup has been completed, the ingress gateway and the MRA may optionally negotiate call parameters such as optimal data compression parameters at 44. The MRA then begins routing data from the client modem, functioning in the capacity of a RAS, at 46.

Figure 5:
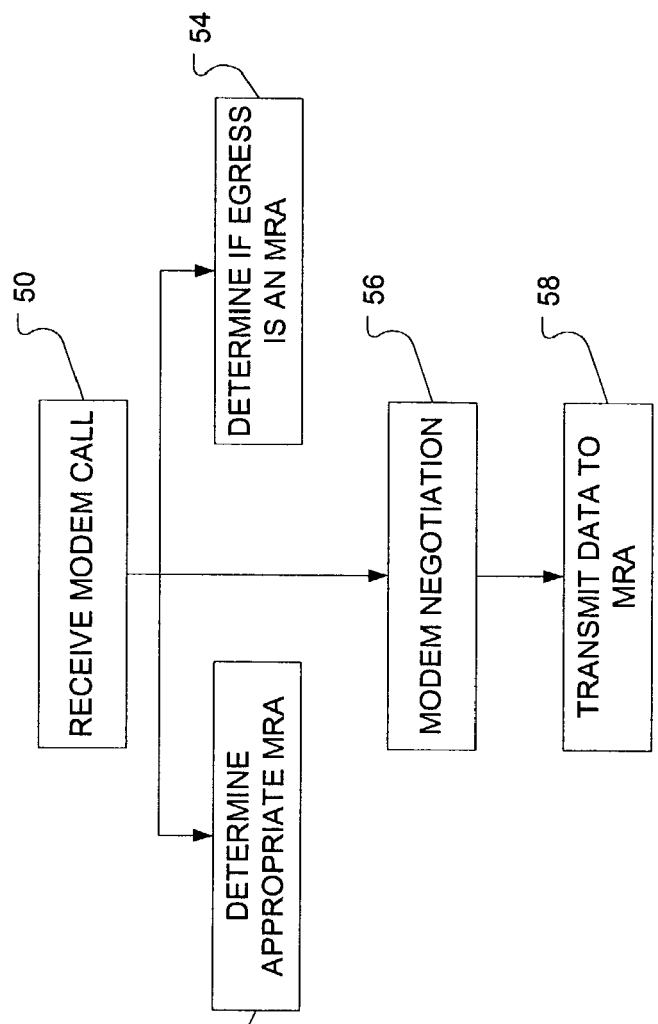
FIG. 5 shows a flow chart of one embodiment of a method to perform modem relay, in accordance with embodiments of the invention.

One embodiment of a process to connect a call using an MRA from the ingress gateway is shown in FIG. 5. The ingress gateway receives a call from a client modem at 50. As mentioned before, the ingress gateway may already realize that the RAS to which the client modem is connecting is actually an MRA. Alternatively, the ingress gateway maybe informed of that during call setup. In the first scenario, the ingress gateway may perform an optional process of determining the appropriate MRA to which the call should be routed at 52. This may be implemented using DNIS (dialed number identification service) in which the ingress gateway associates the dialed number with one of several MRAs. In the second scenario, the ingress gateway may need to determine that the egress gateway is an MRA, as shown at 54.

However, neither of these two processes is necessary. The ingress gateway may already realize that the RAS to which the modem is attempting to connect is an MRA and may start modem negotiation at 56, without any determination of an appropriate MRA. Once the modem negotiation is complete, the ingress gateway routes the data associated with the call to the MRA at 58. The MRA would then function as the RAS and route the data accordingly. All of this is done without the use or need for a DSP, which will be referred to as routing the data directly.

The DSP can be replaced by a less expensive solution such as an FPGA (field programmable gate array) or a general-purpose processor such as a RISC (reduced instruction set) processor. The advantage of the FPGA is that it could implement in hardware the well-defined algorithms, which perform data compression such as V.42bis, and V.44, and create a solution that is faster than a DSP, supports more sessions and is less expensive. The advantage of the general-purpose processor such as a RISC processor is that it is a less expensive method to terminate the PPP protocol stack.

Figure 6:
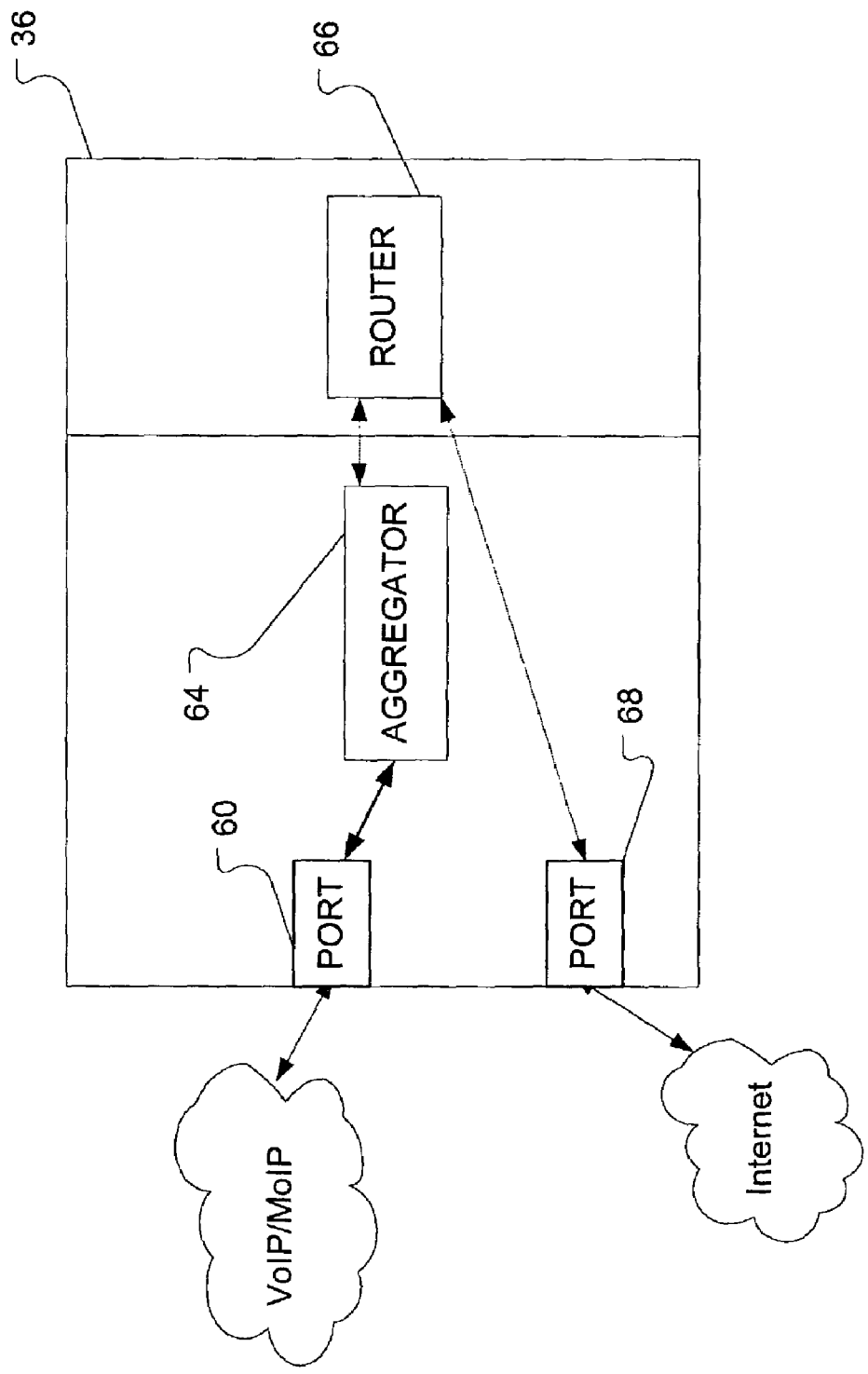
FIG. 6 shows a block diagram of a network device capable of modem relay aggregation, in accordance with embodiments of the invention.

As can be seen in FIG. 6, one embodiment of an MRA is shown. The MRA 36 includes at least one port 60 through which the modem over data networks signals are received. As shown in FIG. 6, the modem over data networks are specific to Internet Protocol (IP) and may be either Voice over IP (VOIP) or Modem over IP (MoIP). However, application of this invention is not restricted to IP, as it may be applied to any packet network. Similarly, both of these specific types of calls will be included in the description of 'modem over data network' call.

When the call is first brought up, the channel is considered a VoIP (Voice over IP) call. The channel is in Audio mode and it uses RTP (Real Time Transport Protocol). The V.MoIP standard specifies two methods to transport modem signals across the packet network. One is Modem Relay that uses a different transport protocol called SPRT (Simple Packet Relay Transport). Therefore, Modem Relay has a different protocol stack using SPRT even though it uses the same VoIP channel. The second method is call VBD (voice band data) where the channel uses RTP and modem signals are transported across the packet network using a codec suitable for modem signals such as under G.711. So VBD is similar to Audio Mode. However, certain special voice setting need to be used in order to transport modem signals reliably, such as using a fixed jitter buffer. In essence, Modem Relay uses the same infrastructure as a VoIP call, but uses a different transport protocol optimally designed to carry modem signals across a packet network.

In the example where a VoIP channel is used to carry on signals in the VBD mode the modem signals are not terminated at the gateways. The gateways transport the modem signals as they are across the VoIP channel using RTP protocol. If Modem Relay is used the physical and Link Layer error corrections are terminated at the gateway. The gateway then uses the protocol SPRT to carry on the modem data across the packet network.

A second port 68 may be used for communication with the network for routing the data associated with the modem over data network call. In actuality, it may be the same port, but for ease of understanding, they are shown as two separate ports here. The aggregator 64 is operable to receive the modem over network signals and terminate the modem or voice call, and then pass the data associated with that call to the router 66 directly, without any modem negotiation. The router then routes the data accordingly. In terminating the call, the aggregator does not responds to the modem signals, as would an MRA with a DSP, but instead may send the signal that indicates that the ingress gateway should handle that activity, if necessary.

During call setup, the aggregator 64 may communicate with the ingress gateway to exchange control signals, beyond any signals sent to identify the device as an MRA. These may be performed using in-band signaling, H.323 or H.248 Megaco format messages, media gateway control protocol (MGCP) messages, or session initiation protocol (SIP) messages, as examples. The aggregator may be a field-programmable gate array (FPGA), or an application specific integrated circuit (ASIC), as examples.

The elimination of the DSP at the MRA provides simplified requirements for the network device hardware, which may in turn lead to lower costs. As mentioned earlier, the elimination of the modem negotiation signals required by current implementations of the MRA eliminates the possibility of delays and packet drops during call setup, making the connection complete faster.

Thus, although there has been described to this point a particular embodiment for a method and apparatus for a modem relay aggregator, it is not intended that such specific references be considered as limitations upon the scope of this invention except in-so-far as set forth in the following claims.

What is claimed is:

1. A network device, comprising:
a port to receive modem over network signals from a source configured to transmit modem tones;
a router to route data associated with the modem over network signals to a network; and
an aggregator to uncompress the modem over network signals, send an identification signal to the source indicating modem negotiation is unnecessary, and send the data associated with the modem over network signals to the router without using a digital signal processor.

2. The network device of claim 1, wherein the aggregator further comprises a field programmable gate array.

3. The network device of claim 1, wherein the aggregator further comprises an application specific integrated circuit.

4. The network device of claim 1, wherein the device further comprises a second port to route the signals from the router.

5. The network device of claim 1, wherein the aggregator is further to deframe point-to-point protocol frames received as data associated with the modem over network signals.

6. A method of providing modem relay, the method comprising:
receiving modem over network signals from an ingress gateway, wherein the modem over network signals are received at the ingress gateway from a modem and the modem over network signals include modem tones;
sending an identification signal to the ingress gateway notifying the ingress gateway that modem negotiation is unnecessary, wherein the identification signal identifies an aggregator; and
routing data associated with the modem over network signals without using a digital signal processor.

7. The method of claim 6, wherein the method further comprises negotiating optimal data compression with the ingress gateway.

8. The method of claim 6, wherein the modem over network signals further comprise control messages using in-band signaling.

9. The method of claim 6, wherein the modem over network signals further comprise control messages using H.323.

10. The method of claim 6, wherein the modem over network signals further comprise control messages using session initiation protocol.

11. The method of claim 6, wherein the modem over network signals further comprise control messages using media gateway control protocol.

12. The method of claim 6, wherein the modem over network signals further comprise control messages using H.248 Megaco.

13. The method of claim 6, wherein the method further comprises using dialed number identification service to route the call to a network device.

14. A method of providing modem connection, the method comprising:
receiving a call from a client modem, the call comprising modem tones;
determining that a terminating device is a modem relay aggregator;
performing modem negotiation with the client modem without receiving any modem tone from the modem relay aggregator; and
transmitting data to the modem relay aggregator.

15. The method of claim 14, wherein the method further comprises using dialed number identification service to identify an appropriate modem relay aggregator.

16. The method of claim 14, wherein determining that the terminating device is a modem relay aggregator further comprises exchanging control messages using in-band signaling.

17. The method of claim 14, wherein determining that the terminating device is a modem relay aggregator further comprises exchanging control messages using session initiation protocol.

18. The method of claim 14, wherein determining that the terminating device is a modem relay aggregator further comprises exchanging control messages using H.323.

19. The method of claim 14, wherein determining that the terminating device is a modem relay aggregator further comprises exchanging control messages using media gateway control protocol.

20. The method of claim 14, wherein the modem over network signals further comprise control messages using H.248 Megaco.

21. The method of claim 6, wherein receiving modem over network signals comprises receiving modem over network signals at a modem relay aggregator.

22. A network device, comprising:
a first port, the first port configured to receive modem over network signals from an ingress gateway, wherein the ingress gateway is configured to receive a call from a client modem and the call comprises modem tones;
a router to route the data associated with the modem over network signals;
an aggregator to uncompress the modem over network signals, send an identification signal to the ingress gateway indicating modem negotiation is unnecessary, and send the data associated with the signals to the router without using a digital signal processor; and
a second port, the second port configured to send the data from the router to a packet network.

23. A method, comprising:
receiving a call at an ingress gateway from a client modem, the call comprising modem tones;
performing modem negotiation between the ingress gateway and the client modem without receiving any modem tone from an egress gateway;
transmitting modem from the ingress gateway to a modem relay aggregator;
sending an identification signal from the modem relay aggregator to the ingress gateway notifying the ingress gateway that modem negotiation with the modem relay aggregator is unnecessary, wherein the identification signal identifies the modem relay aggregator; and
routing data associated with the call using network signals without using a digital signal processor.

24. The method of claim 23, further comprising determining that a terminating device is the modem relay aggregator prior to performing modem negotiation between the ingress gateway and the client modem.

* * * * *